Oct. 14, 1930. H. ALINDER ET AL 1,778,055
NUT MANIPULATING DEVICE
Filed Feb. 27, 1929 3 Sheets-Sheet 1
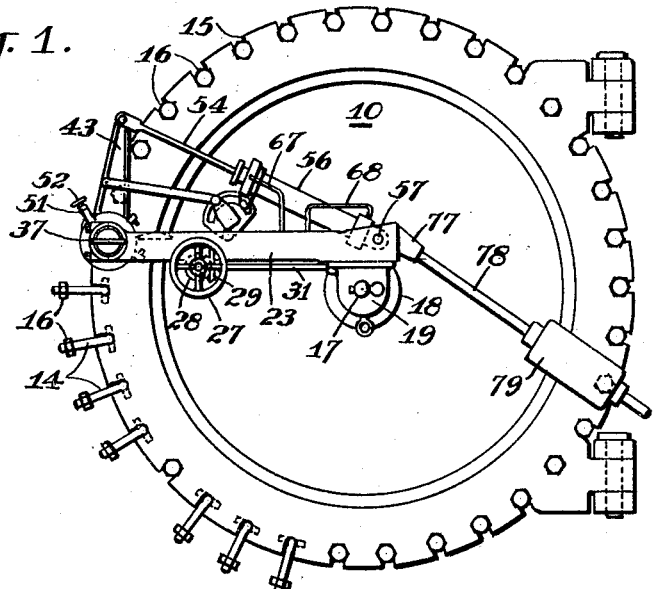
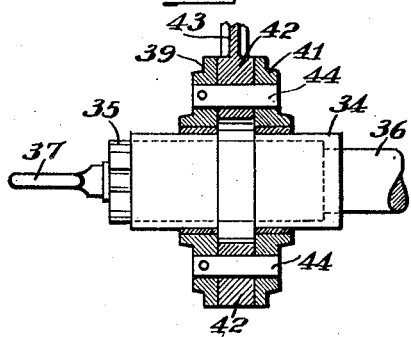
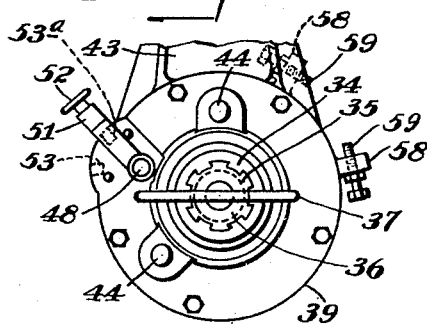
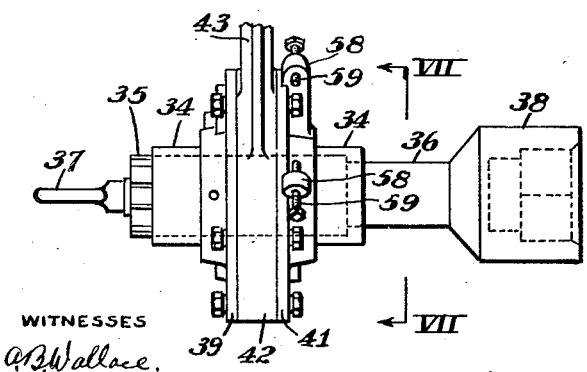
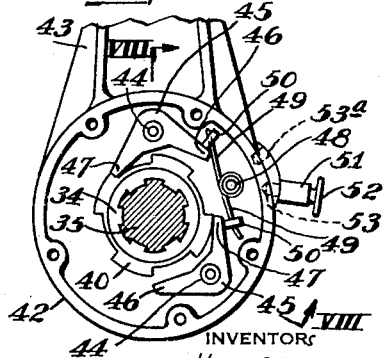

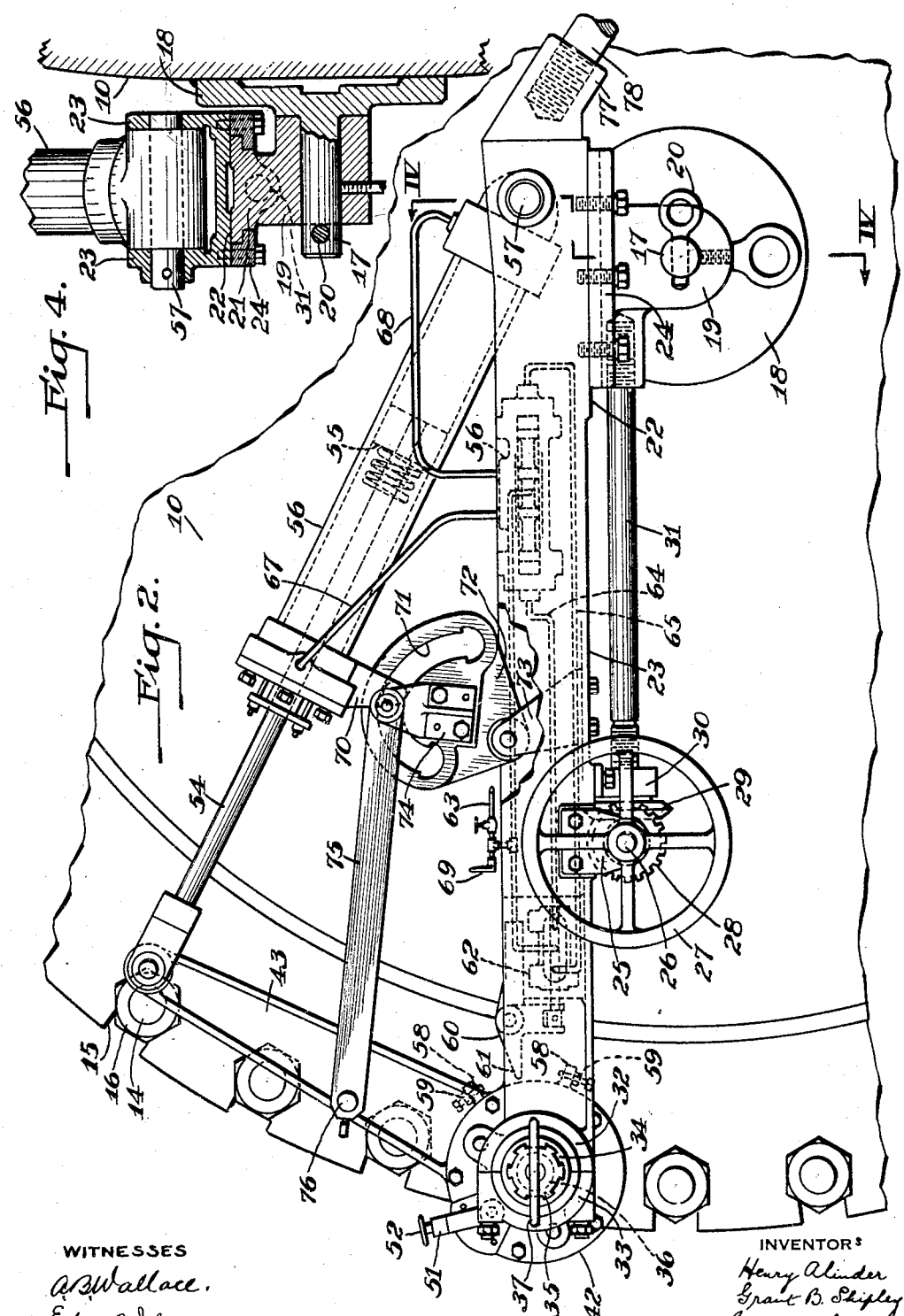

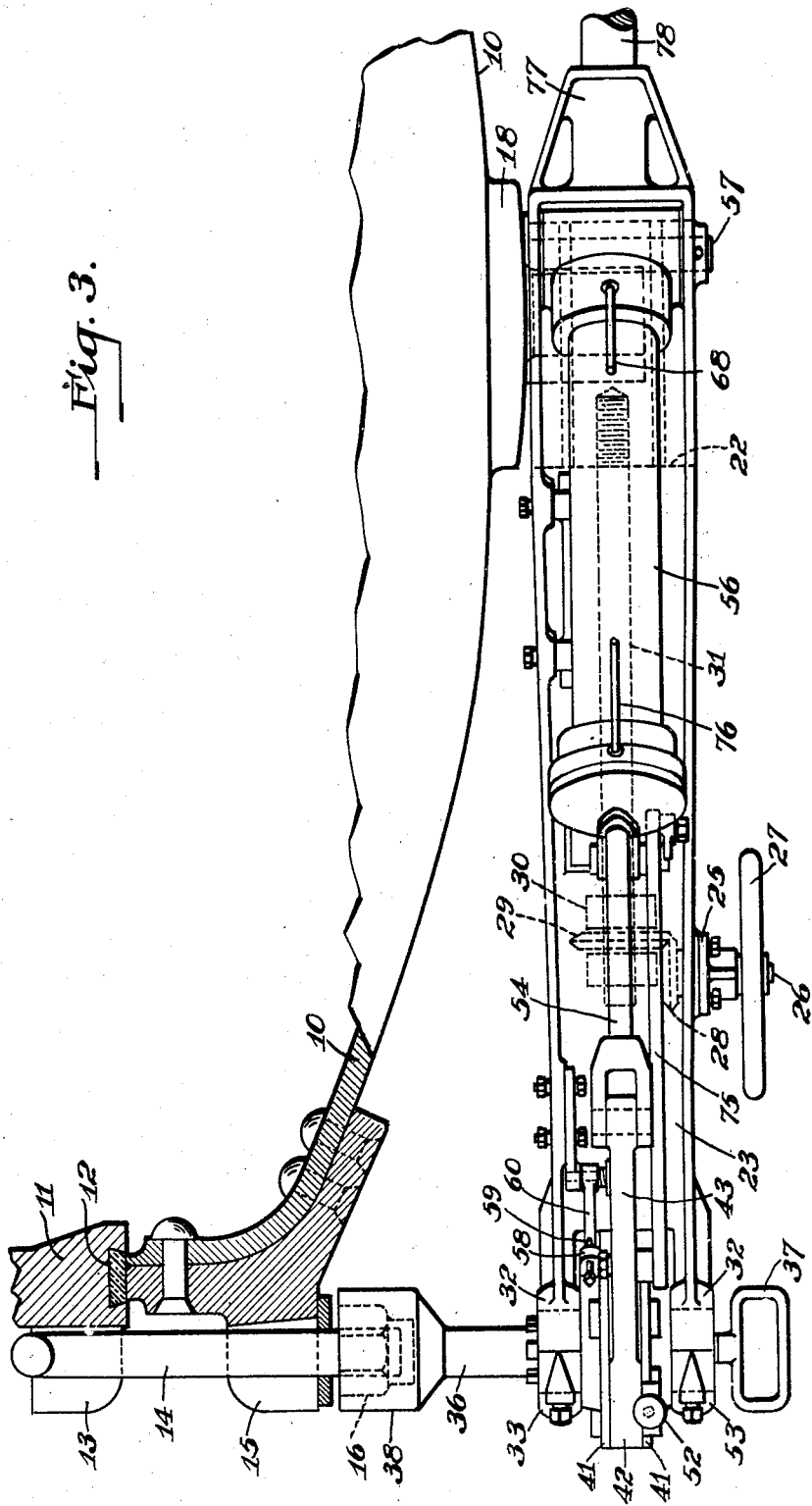

Patented Oct. 14, 1930

1,778,055

UNITED STATES PATENT OFFICE

HENRY ALINDER AND GRANT B. SHIPLEY, OF PITTSBURGH, PENNSYLVANIA, ASSIGNORS TO PITTSBURGH WOOD PRESERVING COMPANY, OF PITTSBURGH, PENNSYLVANIA, A CORPORATION OF PENNSYLVANIA

NUT-MANIPULATING DEVICE

Application filed February 27, 1929. Serial No. 343,090.

This invention relates to nut-manipulating devices, that is to say, to power-operated devices for turning nuts in one direction or the other, according to whether it is desired to tighten or loosen them.

Occasions frequently arise where it is necessary to tighten or loosen a number of nuts, bolts, or the like. One example occurs in connection with the opening and closing of the heads of the large cylindrical retorts, —often ten or more feet in diameter,—which are used in impregnating wood, such as railroad ties and the like, with creosote and similar materials. The heads of these retorts are ordinarily hinged and, when closed, secured to the body of the retort by a series of closely placed heavy nuts which are threaded onto bolts carried by the retort. These nuts must be loosened or tightened whenever the head of the retort is opened, and, when tightened, must be screwed home with considerable force in order that the requisite perfectly tight connection between the head and the body of the retort may be effected.

It is an object of this invention to provide a power-operated device for tightening and loosening nuts in conditions such as those referred to above which is especially easy and convenient in use with respect to the movement of the wrench portion of the device from nut to nut in performing the tightening or loosening operation. It is another object of the invention to provide a nut-manipulating device which is capable of exercising great force in the tightening or loosening of a nut with the application of relatively small power. A further object of the invention is to provide a device of this character which will be economical to produce, of a simple and rugged construction and not liable to get out of order in hard service. Other and further objects of the invention will appear from the following specification taken in connection with the claims annexed thereto.

A nut-manipulating device embodying the invention is described, by way of example, in the following specification, and shown in the accompanying drawings. It is to be understood, however, that the invention may be embodied in other forms and that changes may be made in the form described and shown, without exceeding the scope thereof as defined in the appended claims.

In the drawings—

Fig. 1 is a front elevation of a nut-manipulating device constructed in accordance with the invention, the same being shown as applied to the door of a cylindrical retort;

Fig. 2 is an enlarged view similar to Fig. 1 but showing the ratchet mechanism in a different position;

Fig. 3 is a plan of the device, a portion of the retort head being shown in section;

Fig. 4 is a section on the broken line IV—IV of Fig. 2, looking in the direction of the arrows;

Fig. 5 is an elevation of the pawl housing, shown removed from the beam which supports the same;

Fig. 6 is a side view of the pawl housing and the wrench carried thereby, as seen from the right of Fig. 5;

Fig. 7 is an inverted sectional plan of the pawl housing, the section being taken on the line VII—VII of Fig. 6, one of the housing plates being removed; and Fig. 8 is a section on the line VIII—VIII of Fig. 7.

Referring now to the drawings, the device is shown therein as applied to the head 10 of a large cylindrical retort. This head is hinged to the body 11 (Fig. 3) of the retort and is formed with an edge for abutting tightly against a gasket 12. The retort body 11 is provided with a series of peripheral ears 13, in which are hingedly mounted bolts 14 which pass through slots in a ring 15 forming the edge of the head 10. The outer ends of the bolts 14 are equipped with nuts 16 which, when tightly screwed down, force the edge of the head 10 against the gasket 12 and establish a tight sealing connection between the head and the body of the retort. When it is desired to open the head 10, in order to insert material into the retort or withdraw it from the same, the nuts 16 are loosened, whereupon the bolts 14 can be swung out of the slots in the ring 15 and the head opened.

It will be seen that in the use of the retort all of the nuts 16 must be frequently loosened and tightened, and also that they must be tightened with considerable force in order to create proper sealing engagement of the edge of the head 10 with the gasket 12.

The nut tightening device is pivotally mounted upon a pin 17 which extends from a base 18, the latter being suitably secured to the center of the head 10, as, for instance, by welding. The device comprises a support member 19 which has a hole therein for receiving the pin 17, and which may be secured against removal from said pin by means of a cotter pin 20 passed through the pin 17 beyond the support member 19. The member 19 is formed with a guide 21 (Figs. 2 and 4) upon which is slidably mounted the faced end 22 of the beam 23, which is of channel-shape in cross section and of a length such that its outer end reaches adjacent the periphery of the drum head 10. Gibs 24 are secured to the end 22 of the beam and overhang the edges of the guide 21 of the support member 19, so as to secure the parts against relative movement otherwise than longitudinally with respect to each other.

A bracket 25 is secured to the beam 23 adjacent its center and has rotatably mounted therein a stem 26 having a handwheel 27 at one end and a bevel pinion 28 at the other, The bevel pinion 28 engages a similar pinion 29 secured to a nut which is rotatably mounted in a bearing 30 secured underneath the beam 23. Into this nut is threaded one end of a rod 31, the other end of which is secured to the support member 19. From the above construction it will be seen that a rotating movement of the handwheel 27 in one direction or the other results in a longitudinal movement of the beam 23 with respect to the support member 19, whereby an adjustment is provided to permit the wrench, which is carried at the outer end of the beam, to be engaged properly with the nuts, the distances of which from the center of the head may vary somewhat.

The beam 23 is forked at its end and provided with spaced bearing portions 32 to which are secured bearing caps 33. In the bearings constituted by the portions 32 and caps 33 there is rotatably mounted the wrench sleeve 34 (Figs. 2, 5 to 8). This sleeve is formed with a plurality of internal longitudinal key-ways for receiving corresponding feather keys 35 which are formed upon, and extend outwardly from the wrench stem 36, the latter being provided with a handle 37 at one end and at the other end with a socket 38 adapted for the reception of nuts 16. This construction permits the wrench to be rotated by the wrench sleeve 34 when rotative movement is imparted to the latter and allows the operator to pull the wrench out of engagement with the nut, or push it into such engagement, according to necessity.

The wrench sleeve 34 is formed at its center with a plurality of outwardly extending ratchet projections 40. Rotatively mounted on the sleeve 34, one on each side of the projections 40 are a pair of pawl-housing plates 39 and 41, the latter embracing between them the hub 42 of a pawl lever 43, whereby a housing is constituted in which are located the pawls for actuating the sleeve 34.

Secured to the housing plate 39, and entering the plate 41 are a pair of pivot pins 44 (Figs. 7 and 8) upon which are pivoted a pair of double-ended pawls 45, the ends 46 and 47 of which may be made to engage the ratchet projections 40 according to whether it is desired to rotate the wrench to tighten or to loosen the nut. A pin 48 is pivoted in the housing plate 39 and has secured thereto a pair of springs 49 which enter lugs 50 extending from the pawls 45. When the pin 48 is in the position shown in Fig. 7, these springs 49 tend to force the ends 47 of the pawls into engagement with the ratchet projections 40. However, when the pin 48 is turned in a counter-clockwise direction, the springs 49 will push upon the pawl 45 shown at the top of Fig. 7 and pull upon the pawl shown at the bottom of that figure, with the result that the ends 46 of the pawls will be forced towards the ratchet projections 40, to cooperate with the latter. The pin 48 has a reversing lever 51 secured to its outer end, and this lever is formed with a bearing for a spring pressed pin 52 which is adapted to enter either a hole 53 or a hole 53$^a$ in the pawl-housing plate 39, according to the position of the reversing lever 51. In the position of the parts shown in Figs. 6 and 7 it will be seen that if the pawl lever 43 is rocked with respect to the sleeve 34 the pawls 45 will effect a rotation of the sleeve, and consequently of the wrench, in a direction to tighten the nut. If, however, the reversing lever is moved so that its pin 52 enters the hole 53$^a$ the rocking of the pawl lever 43 will result in loosening the nut.

The pawl lever 43 has pivoted to the outer end thereof the stem 54 of a plunger 55 which operates in a cylinder 56. The cylinder is pivotally mounted at 57 upon the beam 23 adjacent the supporting member 19. The admission of air under pressure alternately to one end and the other of the cylinder 56 results in a reciprocating movement of the plunger 55 which effects a rocking movement of the pawl lever 43 with respect to the wrench sleeve 34. The housing plate 41 is formed with a pair of ears 58 spaced away from each other and in which are threaded abutment studs 59, so that the latter are adjustable. Pivoted upon the beam 23 is a lever 60 (Fig. 2) formed with a nose 61 which is disposed in the path of the abutment studs 59; so that when the plunger 55 moves in one direction one of the studs 59 will engage the nose 61 at the end of such movement, and when the plunger moves in the opposite direction the other stud 59 will engage the nose 61. By this means the lever 60 is rocked first in one direction and then in the other at the end of the movements of the plunger 55 and pawl lever 43.

The lever 60 has operative connection with a relay air valve 62 to which air under pressure is supplied from a line 63. The relay valve 62 is connected, by piping 64, 65, with a main air valve 66 which, in turn, is connected by piping 67, 68 with the air cylinder 56. When the lever 60 is in one of its positions it actuates the relay valve 62 so as to cause air to be admitted, through the line 64, to one end of the main valve 66, and when the lever 60 is in its other position the relay valve is operated to admit air, through the line 65, to the other end of the main valve 66. By this means the air connections to the cylinder 56 are reversed at the end of each operation of the pawl lever 43, so that the latter will rock continuously so long as air is admitted to the valves. A manually operable valve 69 is provided in the main air line 63 by means of which the operator can at will shut off the compressed air and open the valves 62 and 66 to the atmosphere. By this means any pressure of the wrench upon the nut is relieved, and the operator is enabled to pull the wrench away from the nut easily.

In order to sustain the weight of the cylinder 56 and associated parts, which is considerable and which would otherwise be partly put upon the stuffing box through which the plunger rod 54 slides, tending towards a misalignment of the stem 54 with the cylinder 56, the cylinder is provided with a downwardly extending ear 70 carrying a cam roller which enters a cam slot 71 formed in a cam 72, which latter is pivoted to a bracket 73 secured to the beam 23. The cam 72 has a bearing bracket 74 secured thereto and to which is pivoted one end of a link 75 the other end of which is pivoted, at 76, to the pawl lever 43, intermediate the ends of the latter. By this means the cam 72 is caused to rock about its pivot synchronously with the rocking of the pawl lever 43. The cam slot 71 is so formed that by its engagement with the roller carried by the ear 70 of the air cylinder it will support such air cylinder in the correct position at all times, which position, of course, varies because of the arc in which the outer end of the plunger rod 54 travels.

The beam 23 is formed, at its end adjacent the support member 19, with a socket 77 in which is threaded a rod 78 having secured to the end thereof, so as to be adjustable lengthwise with respect thereto, a counterweight 79. This counterweight is of such weight and so arranged on the rod 78 as to balance the beam 23 and the various parts carried thereby, thus enabling the operator to swing the device about its pivot, to cause the wrench to engage one nut after another with little effort.

The operation of the device is as follows,— supposing, for instance, that the retort door is to be secured in closed condition. The operator first moves the reversing lever 51 into a position in which the pin 52 enters the hole 53ª, the pawls 45 being pressed by the springs 49 in such a direction that the rocking movements of the pawl lever 43 will result in the tightening of the nuts. With the wrench pulled back with respect to the wrench sleeve 34 the operator then swings the beam 23 into such a position that the socket 38 is opposite a nut, which he can readily do owing to the balancing of the device by the weight 79. The operator then engages the socket 38 with the nut and operates the valve 69 so that air under pressure is admitted to the relay valve 62 and the main valve 66. Thereupon the plunger 55 will begin to reciprocate in the cylinder 56, rocking the pawl lever 43 and tightening the nut. When the nut has been screwed home, the operator operates the valve 69 again to stop the rocking movements of the pawl lever 43, and release the pressure between the wrench socket and the nut. He then pulls back upon the handle 37, to disengage the socket 38 from the nut which has been tightened, swings the device through a slight angle, and engages the socket 38 with the next succeeding nut, repeating the operation as before. The same operation is followed in loosening the nuts, with the exception, of course, that the reversing lever 51 is shifted into the position shown in Fig. 7, in which the pin 52 engages in the hole 53.

It will be seen that the device is particularly easy and convenient to use in shifting the wrench from one nut to another, the counterbalanced arrangement especially facilitating this. The adjustment, also, by means of the wheel 27 permits the wrench to be easily and quickly applied to nuts which vary in their distance from the center of the retort head. It should further be noted that, by reason of the leverage exerted by the pawl lever 43, considerable force is exerted with the application of relatively small power in the cylinder 56. The swinging cam 72, which supports the cylinder 56 in the correct position at all times, avoids any tendency of the combination of the plunger 55 and cylinder 56 to bend in the middle, and thus renders this construction of the plunger and lever exceedingly practical. The device is especially simple and economical and there are no parts thereof which are likely to get out of order in the course of use.

We claim:

1. A device for manipulating a plurality of nuts disposed in a circle comprising a support pivoted adjacent the center of the circle, a wrench carried by said support, a ratchet actuating lever associated with said wrench, said wrench mounted to turn on an axis parallel to that of the pivot of the support, a cylinder pivoted to said support adjacent its pivot end to swing about an axis parallel to the other pivot and axis and a plunger in said cylinder pivoted to the ratchet actuating lever.

2. A device for manipulating a plurality of nuts disposed in a circle comprising a member pivoted adjacent the center of the circle, a beam associated with said member and longitudinally adjustable with respect thereto, a wrench carried by said beam, a ratchet actuating lever associated with said wrench, said wrench mounted to turn on an axis parallel to that of the pivot of the beam, a cylinder pivoted to said beam adjacent its pivot end to swing about an axis parallel to the other pivot and axis and a plunger in said cylinder pivoted to the ratchet actuating lever.

3. A device for manipulating a plurality of nuts circularly arranged in connection with a vertically disposed member secured thereby, comprising a support, means fixedly associated with the member for pivotally carrying said support on a horizontal axis, a power-actuated wrench carried by said support, and means for counterbalancing said support and wrench.

4. A device for manipulating a plurality of nuts circularly arranged in connection with a vertically disposed member secured thereby, comprising a support, means for pivotally connecting said support with said member on a horizontal axis substantially central of said nuts, a wrench associated with said member, a ratchet device associated with said wrench for turning the latter, a lever for actuating said ratchet device, a plunger for operating said lever, a cylinder for said plunger, said cylinder being pivotally associated with said support on a horizontal axis, means associated with said support for sustaining said cylinder, and means for moving said sustaining means to accord with the movements of said cylinder about its pivot.

5. A device for manipulating a plurality of nuts circularly arranged in connection with a vertically disposed member secured thereby, comprising a support, means for pivotally connecting said support with said member on a horizontal axis substantially central of said nuts, a wrench associated with said member, a ratchet device associated with said wrench for turning the latter, a lever for actuating said ratchet device, a plunger for operating said lever, a cylinder for said plunger, said cylinder being pivotally associated with said support on a horizontal axis, a cam pivotally associated with said support for sustaining said cylinder, and connection means between said lever and said cam whereby the latter is moved to accord with the movements of said cylinder about its pivot.

In testimony whereof, we hereunto sign our names.

HENRY ALINDER.
GRANT B. SHIPLEY.